United States Patent
Urman et al.

(10) Patent No.: US 9,953,100 B2
(45) Date of Patent: *Apr. 24, 2018

(54) AUTOMATED RUNTIME COMMAND REPLACEMENT IN A CLIENT-SERVER SESSION USING RECORDED USER EVENTS

(75) Inventors: Mia Yael Urman, Tel Aviv (IL); Yosef Nakash, Tel Aviv (IL)

(73) Assignee: AURAPLAYER LTD., Tel Aviv (IL)

( * ) Notice: Subject to any disclaimer, the term of this patent is extended or adjusted under 35 U.S.C. 154(b) by 1291 days.

This patent is subject to a terminal disclaimer.

(21) Appl. No.: 13/014,379

(22) Filed: Jan. 26, 2011

(65) Prior Publication Data

US 2011/0185280 A1 Jul. 28, 2011

Related U.S. Application Data

(60) Provisional application No. 61/298,564, filed on Jan. 27, 2010.

(51) Int. Cl.
G06F 15/173 (2006.01)
G06F 17/30 (2006.01)

(52) U.S. Cl.
CPC .............. *G06F 17/30899* (2013.01)

(58) Field of Classification Search
CPC ...................................... H04L 67/10
See application file for complete search history.

(56) References Cited

U.S. PATENT DOCUMENTS

| | | | | |
|---|---|---|---|---|
| 5,511,111 A | * | 4/1996 | Serbetcioglu | H04W 4/12 379/142.01 |
| 5,586,260 A | * | 12/1996 | Hu | G06F 21/33 704/272 |
| 6,070,177 A | * | 5/2000 | Kao | G06F 17/30 707/999.01 |
| 6,088,712 A | * | 7/2000 | Huang | G06F 9/45512 715/201 |
| 6,243,711 B1 | * | 6/2001 | Wu | G06F 9/4443 |
| 6,539,402 B1 | * | 3/2003 | Sorenson | G06F 11/1471 |

(Continued)

OTHER PUBLICATIONS

"Oracle Forms Services & Oracle Forms Developer 11g Technical Overview," Jan Carlin, Jun. 2009 ("Carlin I").*

(Continued)

*Primary Examiner* — Kevin L Young
*Assistant Examiner* — F J Farhadian
(74) *Attorney, Agent, or Firm* — Roach Brown McCarthy & Gruber, P.C.; Kevin D. McCarthy

(57) ABSTRACT

A method for automatically operating an Oracle Forms application, the method comprising: intercepting, using a Listener component of the Oracle Forms application, a communication between the Oracle Forms application and an Oracle Forms server, and storing the intercepted communication; identifying, in the intercepted communication, data associated with at least one user input field of the Oracle Forms application; replacing, in the intercepted communication, the identified data with new data corresponding to the user input field of the Oracle Forms application, to produce a new communication; and transmitting the new communication to the an Oracle Forms server, using a Dispatcher component of the Oracle Forms application, thereby causing the Oracle Forms application to operate automatically.

2 Claims, 8 Drawing Sheets

(56) References Cited

U.S. PATENT DOCUMENTS

| | | | | |
|---|---|---|---|---|
| 6,625,732 B1* | 9/2003 | Weirauch | G11B 20/10 | 360/48 |
| 6,651,216 B1* | 11/2003 | Sullivan | G06F 17/246 | 715/205 |
| 6,697,754 B1* | 2/2004 | Alexander | G01R 13/22 | 702/119 |
| 6,704,906 B1* | 3/2004 | Yankovich | G06Q 10/10 | 715/222 |
| 6,820,023 B1* | 11/2004 | Klassen | B23K 31/12 | 702/83 |
| 6,928,425 B2* | 8/2005 | Grefenstette | G06F 17/30011 | 707/754 |
| 6,999,960 B2* | 2/2006 | Daily | G06F 3/0605 | |
| 7,000,179 B2* | 2/2006 | Yankovich | G06Q 10/10 | 715/222 |
| 7,007,232 B1* | 2/2006 | Ross | G06F 17/243 | 707/E17.107 |
| 7,072,938 B2* | 7/2006 | Diec | G06F 17/3089 | 345/619 |
| 7,103,835 B1* | 9/2006 | Yankovich | G06Q 10/00 | 715/234 |
| 7,167,839 B1* | 1/2007 | Layne | G06F 21/6227 | 705/38 |
| 7,216,300 B2* | 5/2007 | Dang | G06F 9/4443 | 715/738 |
| 7,415,476 B2* | 8/2008 | Borrowman | G06F 21/64 | |
| 7,539,938 B2* | 5/2009 | Ross | G06F 17/243 | 715/200 |
| 7,546,286 B2* | 6/2009 | Dickinson | G06F 17/246 | |
| 7,546,291 B2* | 6/2009 | Selca | G06F 17/30392 | |
| 7,574,501 B2* | 8/2009 | Louie | G06Q 10/06 | 707/999.001 |
| 7,647,349 B2* | 1/2010 | Hubert | G06F 17/30011 | 707/999.107 |
| 7,716,168 B2* | 5/2010 | Selca | G06F 17/30306 | |
| 7,743,026 B2* | 6/2010 | Saliba | G06F 17/30168 | 707/638 |
| 7,769,757 B2* | 8/2010 | Grefenstette | G06F 17/30867 | 707/713 |
| 7,941,446 B2* | 5/2011 | Hubert | G06F 17/30011 | 707/791 |
| 8,005,875 B2* | 8/2011 | Hickey | G06F 17/30699 | 707/804 |
| 8,135,755 B2* | 3/2012 | Selca | G06F 17/30292 | 707/803 |
| 8,219,557 B2* | 7/2012 | Grefenstette | G06F 17/30867 | 707/736 |
| 8,239,413 B2* | 8/2012 | Hubert | G06F 17/30011 | 707/791 |
| 8,239,825 B2* | 8/2012 | Boss | G06Q 10/10 | 707/999.202 |
| 8,402,067 B2* | 3/2013 | Hickey | G06F 17/30699 | 707/706 |
| 8,645,915 B2* | 2/2014 | Boss | G06Q 10/10 | 707/999.202 |
| 8,839,100 B1* | 9/2014 | Orofino, II | G06F 17/2288 | 715/205 |
| 2002/0048354 A1* | 4/2002 | Perlman | H04L 12/2856 | 379/93.25 |
| 2002/0120468 A1* | 8/2002 | Atallah | G06Q 40/02 | 705/2 |
| 2002/0129037 A1* | 9/2002 | Nathan | G06F 21/6245 | |
| 2006/0155954 A1* | 7/2006 | Haynes | G06F 9/542 | 712/1 |
| 2007/0260632 A1* | 11/2007 | Parsons | G06F 17/3089 | |
| 2008/0051064 A1* | 2/2008 | Jones | G06Q 10/10 | 455/412.2 |
| 2008/0086443 A1* | 4/2008 | Prabhu | G06F 17/30867 | |
| 2009/0287716 A1* | 11/2009 | Dant | G06F 17/3056 | |
| 2010/0042573 A1* | 2/2010 | Wenig | G06F 9/54 | 706/47 |
| 2011/0185280 A1* | 7/2011 | Nakash | G06F 17/30899 | 715/736 |
| 2014/0337728 A1* | 11/2014 | Urman | H04L 67/10 | 715/709 |

OTHER PUBLICATIONS

"New Features in Oracle Forms Server 11g," Jan Carlin, Jun. 2009 ("Carlin II").*

Professional IT software & services, "Migrating Complex Oracle Forms Applications to APEX: Utopia or Reality? A step-by-step journey to successfully modernizing legacy Oracle Forms applications to Oracle Application Express". PITSS.CON 11.0.0, White Paper, Nov. 2010. pp. 1-9.

HP Performance Center, "Gain a complete solution to help optimize your application performance across the lifecycle", copyright 2006, updated Aug. 2010, Rev. 2, Hewlett-Packard Development Company, LP. 2 pages.

Automate performance testing to predict system behavior and improve application performance, Business white paper "The incredible rate of change and the explosion of software complexity due to application modernization introduce tremendous risk into the software development process", created Aug. 2007, update Apr. 2010, Rev. 1 Hewlett-Packard Development Company, LP.—12 pages.

HP Unified Functional Testing software, "Now you can automate the functional testing of transactions that span multiple application layers, cutting the cost and complexity of the testing process while improving application quality", Aug. 2010. 4 pages.

Bmcsoftware, "Predictive Intelligence: Identify Future Problems and Prevent Them from Happening", best practices white paper, 2009. 7 pages.

Intellinx Software Inc., Insider Threat Intelligence, "Insider Threat SOA Solution for the Enterprise" (believed to be published prior to the priority date of the current application, namely, Jan. 27, 2010). 2 pages.

Whitebox Security, "Enterprise business applications and information resources form a complicated schema of business assets. Real time user activity visibility is crucial for protecting business applications. Visibility is the first step towards a security based on knowledge and on true intelligence", 2010. 4 pages.

Bmcsoftware Business, "BMC ProactiveNet Performance Management—Application Diagnostics", Technical white paper, 2009. 10 pages.

CA wily technology, "CA Wily Customer Experience Manager TM", 2009. 4 pages.

Webpage—correlsense, "IT Reliability TM through Business Transaction Management", 2015. 20 pages.

Copyright IBM Corporation, "IBMTivoli Monitoring", 2009. 6 pages.

"Oracle® Enterprise Manager". Administration, 10g Release 5 (10.2.0.5), E14586-03, Dec. 2009. 350 pages.

Jan Carlin, New Features in Oracle Forms 11g, An Oracle White Paper, Oracle Forms Service & Oracle Forms Developer 11 g Technical Overview, Jun. 2009. 22 pages.

"From Oracle Forms to Oracle ADF and JEE. Modernizing Oracle Forms applications to Oracle Application Development Framework and the JEE Architecture". PITSS.CON 8.0.3, White Paper, Nov. 2010. pp. 1-11.

CipherSoft Inc., "Migrate Oracle Forms to the Web. Making the Business Case", White paper, 2009. 9 pages.

Mohamad Afshar, "Oracle Service-Oriented Architecture Suite". Best of Breed SOA Tools and Middleware, Jul. 2006. 33 pages.

New Features in Oracle Forms Server 11g, An Oracle White Paper, Jun. 2009. 21 pages.

* cited by examiner

AUTOMATED RUNTIME COMMAND REPLACEMENT IN A CLIENT-SERVER SESSION USING RECORDED USER EVENTS

CROSS REFERENCE TO RELATED APPLICATIONS

This application claims the benefit of U.S. Provisional Patent Application No. 61/298,564, filed Jan. 27, 2010 and entitled "Oracle Forms Auditing, Recorder and Playback, Real-Time Protection and Integration Tool", which is incorporated herein by reference in its entirety.

FIELD OF THE INVENTION

The invention relates to a computerized toolset for use with Oracle Forms.

BACKGROUND OF THE INVENTION

Oracle Forms, provided by Oracle Corp., is a component of Oracle Fusion Middleware, and is essentially a software product for creating interfaces and data entry systems for Oracle databases. In addition, Oracle Forms is widely used as a development platform for several of Oracle's packaged solutions versions, such as Oracle E-Business suite and Oracle Financials (formerly iFlex). Oracle Forms facilitates Oracle technology to design and build enterprise applications quickly and efficiently. Oracle Forms has an integrated development environment, and was originally developed to run server-side terminal sessions. Later on, Oracle Forms was ported to other platforms, including Windows, to function in a client-server environment. Oracle Forms applications take advantage of web technologies and service oriented architectures (SOA), and later versions were adapted and integrated with Java and web services.

In general, a DBMS (database management system) is toolset that organizes the storage of data. DBMS allows organizations to centralize, manage and control organization-wide data maintenance, manage integrated collections of data records, and manage the flow of corporate information. In large systems, a DBMS allows users and software to store and retrieve data in a structured way. The Oracle database (commonly referred to as Oracle RDBMS or simply Oracle) is an RDBMS (relational database management system) produced and marketed by Oracle Corp.

Oracle Database users may develop Oracle-compatible applications in various programming languages, such as Java and PL/SQL, with the use of tools such as Oracle JDeveloper, Oracle Forms and Oracle Reports. Oracle Forms relates to a software product for creating a visual UI (user interface) that interacts with an Oracle database.

Oracle Forms may support generation of multiple UI elements in order to interact with an Oracle database, including buttons, menus, scrollbars, text fields and graphics. In addition to the features of visual layout, editing Oracle Forms provides special functions called triggers, which are events triggered by the occurrence of user peripheral events such as keyboard strokes or mouse movements. Forms Builder is the component which may be used to create applications for interacting with Oracle databases In Oracle Forms, the form's source code may be compiled into an "executable" file, that may be executed and interpreted by the OracleAS (Oracle application server) forms runtime module.

Oracle Forms Server (also "Forms server") is an application server that is optimized for deploying Forms Developer applications to the Internet. Forms server may use the Forms Listener Servlet (a Java server side module) to start, stop, and communicate with the Forms runtime module. The Forms runtime module may be used to execute the form's source code contained in a particular Forms application. The Forms Listener Servlet may be used to manage the creation of a Forms runtime module for each client and manages the network communications between the client and its associated Forms runtime process.

Oracle Forms may use either Java Runtime Environment or Oracle JInitiator to run the GUI (graphical user interface) in conjunction with the OracleAS Forms Services and the Forms Listener Servlet, to provide the web-based forms runtime environment.

Oracle JInitiator, which is a JVM (Java Virtual Machine), may be called as a browser plug-in or an ActiveX control and used to for running web-based Oracle Forms client applications inside a web browser.

U.S. Pat. No. 6,070,177 to James Wei-Ching Kao et al. discloses a system for associating an audit history with a database form. A database document is displayed on a first portion of a display on network client computer. An audit history is displayed on a second portion of the display. The audit history contains information describing the transmission history of the document and any action taken with regard to the document. The audit history is updated automatically as the document is transmitted from one user to another user in the network. This patent is incorporated herein by reference in its entirety.

SUMMARY

There is therefore provided, in accordance with an embodiment, a method for automatically operating an Oracle Forms application, the method comprising: intercepting, using a Listener component of the Oracle Forms application, a communication between the Oracle Forms application and an Oracle Forms server, and storing the intercepted communication; identifying, in the intercepted communication, data associated with at least one user event of the Oracle Forms application; replacing, in the intercepted communication, the identified data with new data corresponding to the user event of the Oracle Forms application, to produce a new communication; and transmitting the new communication to the an Oracle Forms server, using a Dispatcher component of the Oracle Forms application, thereby causing the Oracle Forms application to operate automatically.

In some embodiments, the method further comprises interfacing with a computer-telephone integration (CTI) system for receiving a caller identifier; and utilizing the caller identifier as at least a part of the new data, such that the automatic operation of the Oracle Forms application comprises displaying information associated with the caller.

In some embodiments, the method further comprises prior to replacing the identified data, providing a web-based user interface enabling a user to input at least a part of the new data.

In some embodiments, the method further comprises causing the Oracle Forms application to operate automatically comprises causing the Oracle Forms application to operate silently.

In some embodiments, causing the Oracle Forms application to operate automatically comprises causing the Oracle Forms application to operate visually, by displaying responses received from the Oracle Forms server.

There is further provided, in accordance with an embodiment, a method for auditing communications between a client running an Oracle Forms application and an Oracle Forms server, the method comprising: running a memory-resident auditing agent in the client; using the auditing agent, automatically interfacing with a Listener component of the Oracle Forms application, to intercept communications between the Oracle Forms application and an Oracle Forms server; transmitting at least a portion of the intercepted communications to an auditing server; and in the auditing server, parsing the transmitted communications, to produce an audit report which lists a set of actions performed by the client, along with a corresponding textual description of at least a portion of the Oracle Forms application.

There is further provided, in accordance with an embodiment, a method for monitoring communications between a client running an Oracle Forms application and an Oracle Forms server, the method comprising: running a memory-resident monitoring agent in the client; using the monitoring agent, automatically interfacing with a Listener component of the Oracle Forms application, to intercept communications between the Oracle Forms application and an Oracle Forms server; producing performance data, based on the intercepted communications, and transmitting the performance data to a monitoring server; and analyzing the performance data, to produce a performance report.

In some embodiments, analyzing of the performance data to produce the performance report is performed in the monitoring server.

In some embodiments, analyzing of the performance data to produce the performance report is performed in a management console.

There is further provided, in accordance with an embodiment, a method for monitoring communications between a client and an Oracle Forms server, the method comprising: running a memory-resident monitoring robot and a memory-resident monitoring agent in the client; remotely triggering the monitoring robot at pre-determined times, by a monitoring server, to generate and transmit a communication to an Oracle Forms server; intercepting, using the monitoring agent, a response to the communication received from the Oracle Forms server, and producing performance data; and analyzing the performance data, to produce a performance report.

In some embodiments, analyzing of the performance data to produce the performance report is performed in a monitoring server.

In some embodiments, analyzing of the performance data to produce the performance report is performed in a management console.

BRIEF DESCRIPTION OF THE FIGURES

Exemplary embodiments are illustrated in referenced figures. The figures are listed below.

DETAILED DESCRIPTION

An aspect of some embodiments relates to a computerized toolset for use with Oracle Forms. While Oracle Forms is a robust development tool, it has many limitations. Oracle Forms does not usually support modifying the form's functionality in real-time. In addition, Oracle Forms does not usually support integration with external applications. Oracle Form modification may require familiarity with PL/SQL syntax, as well as detailed knowledge of the application itself.

The toolset according to the present embodiments may be used to expedite and facilitate the process of customizing Oracle Form functionality at runtime and provide a flexible toolset for monitoring, auditing and restricting user actions, recording and playing user actions and integrating with a managerial dashboard, unified desktop and CTI (computer-telephone integration).

The toolset may be configured to performed automatic operations without user intervention. Form applications may be manipulated at runtime, including limiting and restricting user access to information and tracking the audit data of user actions. The toolset may be configured to provide real-time auditing and protection against fraud and internal threats. The toolset may be configured to generate real-time alerts in applications, ad-hoc locking of fields and stopping user actions as they occur in real-time, without changing the underlying application.

In addition, the toolset may be configured to support automatic execution of a wide variety of functions.

Figure 1:
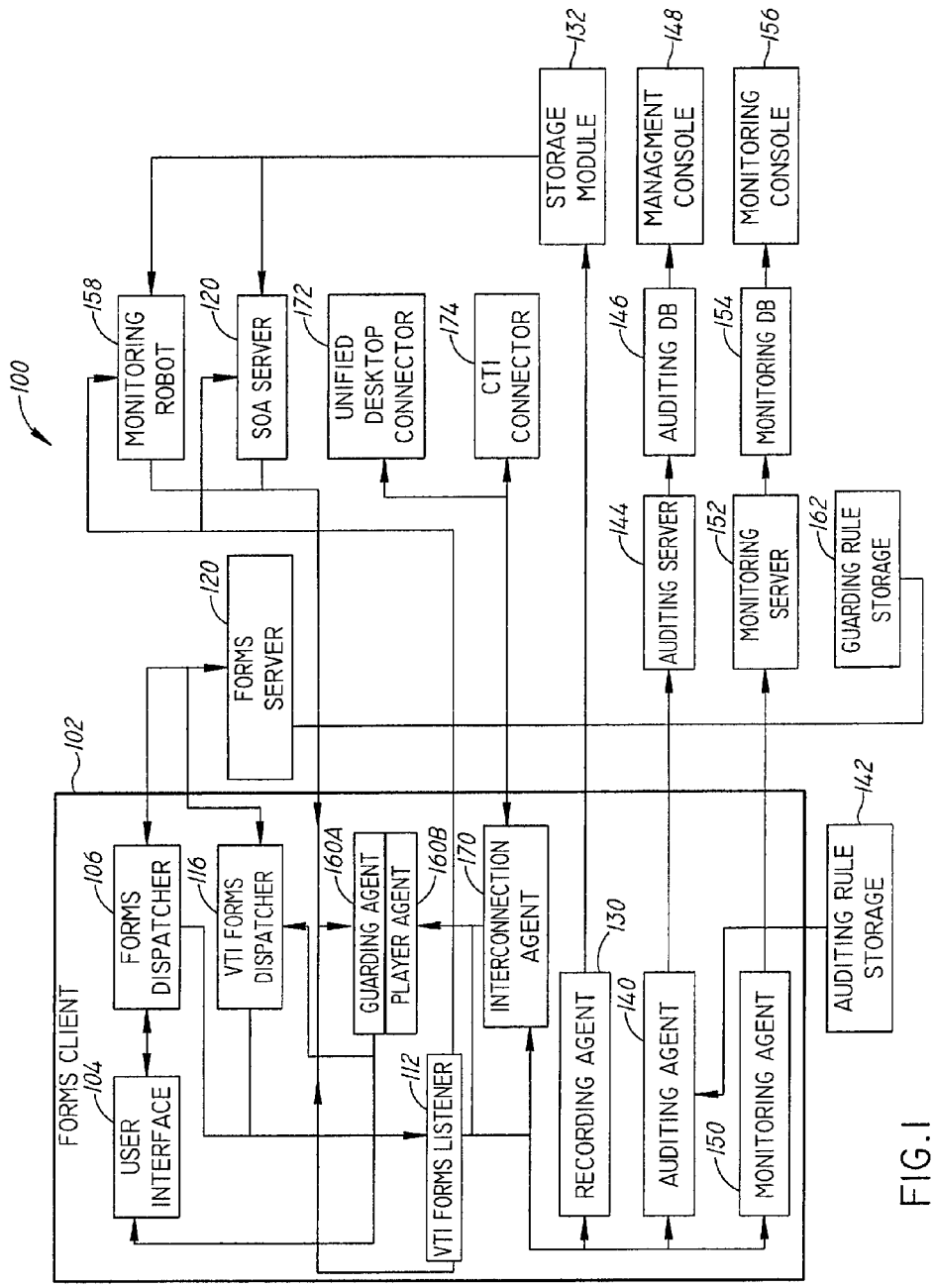
FIG. 1 shows a block diagram of an Oracle Forms toolset.

Reference is now made to FIG. 1, which shows a block diagram of an Oracle Forms toolset 100, according to some embodiments.

A Forms client 102 may be used within a web browser in order to interact with the end-user during a user session. Forms client 102 may include a user interface 104, which is used to interact with the user.

The term "user events" is an overall term used herein to describe all possible interactions of the user with an Oracle Forms application, including receiving input from the user, displaying screens and/or output to the user, user button clicks, mouse movements and/or the like.

The term "user events" may also refer to unique session identifiers, such as session ID, server hostname, port, URL of the session, usernames and/or other session-specific data.

In addition, Forms client 102 may include a Forms dispatcher 106. Forms dispatcher 106 may be configured to interact with a remote Oracle Forms server 120, including transmitting user events and receiving Oracle Forms server 120 reactions. A VTI (vendor tool interface) Forms Listener 112 may be configured to intercept communications between Forms dispatcher 106 and Oracle Forms server 120. Additionally, VTI Forms Listener 112 may be configured to transfer relevant intercepted data to one or more other modules of Oracle Forms toolset 100.

Generally, Oracle Web Forms toolset 100 may include a recording agent 130 configured to support real-time recording of user events within Oracle Web Forms application. Such events may include user actions, data retrieved and changes made to Oracle Web Forms application data.

Recording agent 130 may be configured to receive and record intercepted data transmitted from VTI Forms Listener 112, including user session events as they are transmitted from Oracle Web Forms client application 102 (either JInitiator or Sun JVM java applet) to a Forms server 120.

Recording agent 130 may be configured to receive and record an entire sequence of user session events into a single or multiple scenario files. A "scenario file" may be, essentially, a script including commands for running the Forms application. Multiple scenarios files may be saved under unique names on a local or remote location and may be played back either on demand or as part of a workflow or an external business process.

In addition, each scenario file may be produced per user, per session and as a result, user session may produce multiple scenario files.

Recording agent 130 may be configured to support data based dynamic intervention to control the outcome of recorded user events. Recording agent 130 may be configured to support external tool access to recorded user session data, including: methods, triggers and query forms data without user intervention.

Figure 2:
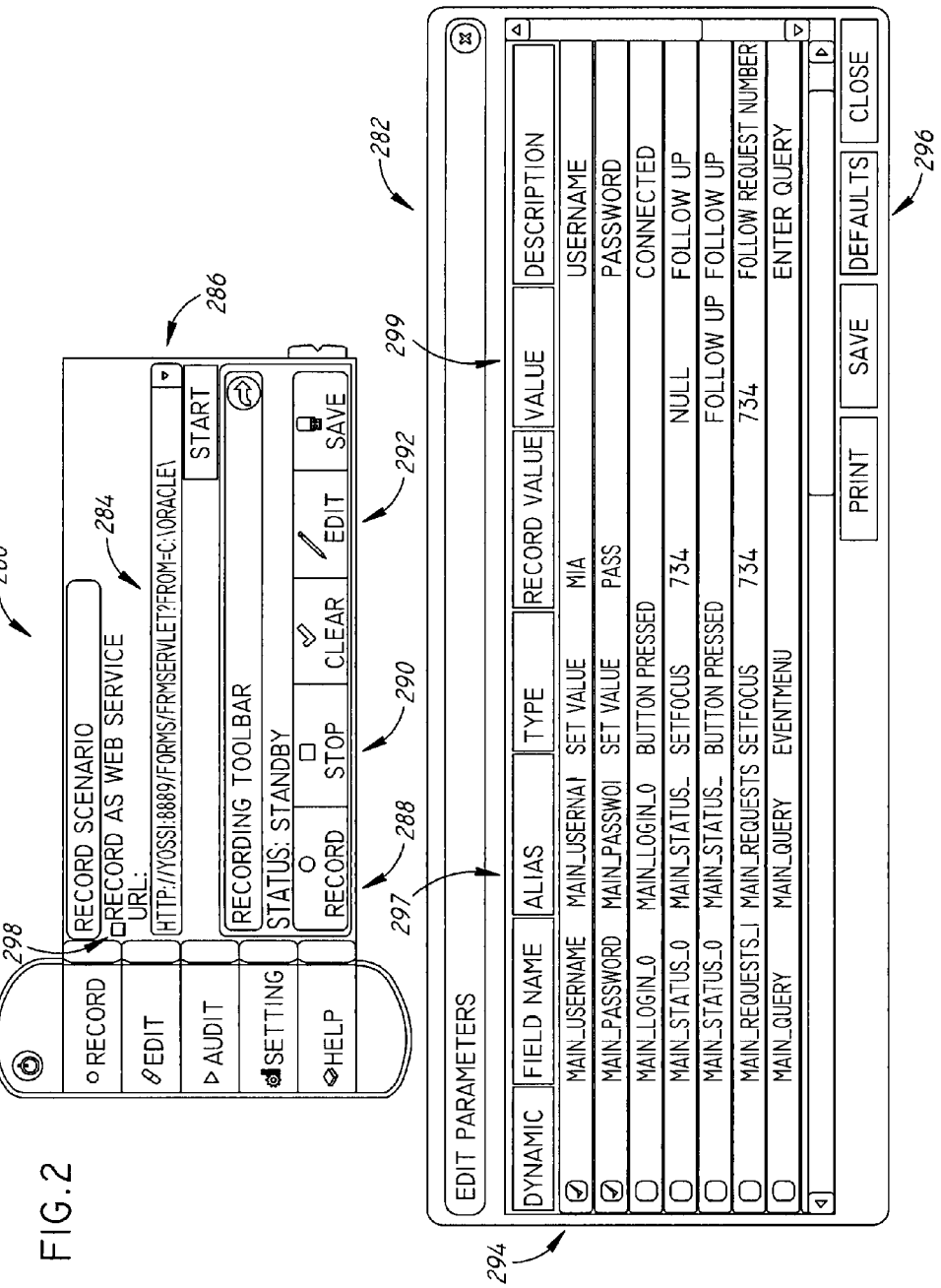
FIG. 2 shows a semi-pictorial view of an Oracle Forms toolbar.

Reference is now made to FIG. 2 which shows a semipictorial view of an Oracle Forms recording toolbar 280, which may be configured to operate recording agent 130 of FIG. 1 and allow a user to record his actions and manage the recording process while working in the Oracle Forms application.

A Uniform Resource Locator (hereinafter "URL") bar 284 may be used to allow the user to enter a Forms client 102 URL he wishes to record. Alternatively, the user may choose past URLs stored for convenience and displayed within a drop-down list 286 of stored URLs.

Once the URL of the Forms client 102 is entered, recording agent 130 may associate recording toolbar 280 with the session. Once the user starts interacting with a Forms client 102 (FIG. 1), recording agent 130 (FIG. 1) may be associated with Forms client 102 (FIG. 1) session. Recording agent 130 (FIG. 1) may be configured to support partial or full session recording.

Recording toolbar 280 may include a "record" button 288 which may be used to begin the recording process, and a "stop" button 290 which may be used to end the recording process. Alternatively, recording agent 130 may be configured to begin the recording process whenever a specific URL is launched, without the need to use the record button 288. This is enabled by checking a "record as a webservice" check box 298.

Once the record button 288 is clicked on recording toolbar 280, the recording process begins and any user events occurring in user interface 104 session are recorded and added to a scenario file. In addition, all values entered into fields in user interface 104 are recorded as input parameters.

Once the stop button 290 on the recording toolbar 280 is clicked, the recording session is complete and all values that were entered into fields during the record process can now be reviewed and edited.

Recording toolbar 280 may include an edit button 292 which may be used to open a parameters window 282.

Parameters window 282 may be used to view and edit saved scenario files having input and output parameters that were recorded during session recording. Parameters window 282 may be configured to display user event data, including: entered data, retrieved data and parameters captured during the session recording.

At the parameters window 282, the user may define which fields can be registered as input or output parameters for playback in which values are entered, or as an output parameter in which values received. A dynamic checkbox 294 may be configured to allow the user to choose whether given fields will be registered as static or dynamic during playback. If a field is deemed static, external systems may not alter this fields values at runtime. A defaults button 296 may be configured to allow the user to return the parameter field value to the value that was entered by the user who recorded the original scenario. In FIG. 2, this would mean that the value column would get the recorded value column data. Once a field has been determined to be registered as static, the user may decide whether to keep the value that was set during the recording session as default or to enter a new default value 299, by editing the data found in the value column in the row of the table corresponding to the field.

In addition, parameters window 282 may include an alias 297 column which may be configured to allow the system administrator to add aliases to the input and output parameters, to serve as the reference names for parameters when used by external system, dynamically, during playback.

In an embodiment, a method for auditing communications between a client running an Oracle Forms application and an Oracle Forms server is provided. Auditing is, many times, a governmental requirement for financial institutions and banks. Oracle Forms toolset 100 may be configured to provide a robust client-side auditing solution for Oracle Forms. Oracle Forms toolset 100 may be configured to enable a system administrator to audit and monitor all user actions performed over the Oracle Forms.

The term "audit trail" refers an extensive log of user events. The principle is to allow identification each step in from the comprehensive chronicle list of user events through the entire user interactions with Oracle Forms.

An example of an audit trail on an invoice issued by a vendor may include the following steps: Beginning with the receipt of the invoice, the document is tracked through Accounts Payable, all the way through to the issuance of a check or electronic payment to settle the debt.

Audit trail produced in the process of auditing may uncover attempts to manipulate the financial profile of an entity, perhaps in an attempt to cover up the fact that funds are missing or were misappropriated in some manner. In general, an audit trail may help to ensure that transactions are conducted smoothly, without user intervention and honestly, with the least amount of necessary steps employed in the process.

While many organizations choose to maintain a certain level of access logs, this might provide insufficient resolution due to several limitations. One of the limitations may be the result of missing records or missing field-level data. For example, some existing logs may contain information at the transaction level only, such as which users accessed which transaction at what time? In addition, critical information is still missing, such as which specific records and fields did the user access, and what the user did with the data. Another limitation may result from unregistered read-only actions. Some existing logs may record update activities only. Log may not register instances when information is accessed but not changed. However, such information is very important for preventing and investigating information leakage and for privacy protection. Another limitation may result of unregistered instances of incomplete activities. Some logs are maintained in disparate systems or applications which make it difficult to find and correlate relevant information.

Reference is made back to FIG. 1. According to some embodiments, an auditing agent 140 may be configured to run within Forms client 102. Auditing agent 140 may be configured to receive intercepted data transmitted from VTI Forms Listener 112 including user events as they are transmitted from Forms Dispatcher 106 to Forms server 120.

Auditing agent 140 may include an audit filter, which may include audit filtering rules including lists of specific Forms and specific fields to include or omit in the auditing process. Audit filter may be stored locally or remotely on an auditing rule storage 142 and may be written in an XML (extensible mark-up language) format. The audit filter may help to prevent overflowing of the auditing database with non-relevant data that is not needed to the auditing process. Audit filtering rules file may be created automatically or manually by the system administrator and may include auditing rules including: list of fields to be ignored, list of fields to be watched and list of fields of responses the user receives from the Forms server. When a user event occurs, auditing agent 140 may be configured to check whether a user event should be filtered according to the specified rules. If user event is slated to be ignored in the audit filter, it is not recorded to the audit database. The filtering level may be performed in a menu name level, a field names level, a full form level, item name level or form items such as buttons or key strokes or the like.

In addition, auditing agent 140 may be configured to produce auditing data including: analysis of user events, capturing the state of the form before each user event, description of user events, and the state of the form after the user events had occurred.

Auditing agent 140 may be configured to transmit auditing data to either local or remote auditing server 144, which may use either a local or remote auditing DB 146 to store auditing data. Alternatively, auditing data might be transferred to an auditing collection or presentation tool. Auditing data may be transmitted using several formats, including HTTP, XML, JMS, and/or the like.

A management console 148 may be configured to receive auditing data from auditing DB 146 and to perform audit data analysis. In addition, management console 148 may be configured to produce audit reports and allow a system administrator to review audit data and audit reports and to perform searches in audit data, for example, for all users who accessed a specific account number within a specific timeframe across any application or platform in the enterprise. Management console 148 may enable the system administrator to drill down on any user session data retrieved by the query and replay the user's actions screen by screen, keystroke by keystroke, without any changes to the underlying code and with no need for developer programming.

Auditing agent 140 may be configured to be automatically downloaded from a remote location to Forms client 102 by the use of an automatic distribution mechanism, for example a distribution mechanism similar to the one used to download the Oracle Form jar files. The automatic distribution mechanism may be configured to start automatically as the user launches Form client 102.

Auditing agent 140 may be configured to support users session events tracking at the form level optionally in real-time. Tracking user session events at the form level may include data reviewed by the user, Forms fields that the user selected or manipulated including user events that were not part of the interaction with the even if it was not stored to the DB.

In addition, auditing agent 140 may be configured to seamlessly generate a log of data changed or reviewed by each user, and actions performed by each user including: keys presses, button presses, and/or the like.

Inferior alternatives to the auditing functionality provided by the advantageous auditing agent 140 may require adding trigger functionality to the Oracle Forms during the development process to create a log mechanism to these applications. This may require adding PL/SQL code to be triggered at each event in the form during programming. In large enterprises adding PL/SQL code may require up to tens of thousands of online programs, this can translate into hundreds of programmer-months, not including the overhead on the database servers and additional maintenance required. The time, money and effort required for generating the detailed audit trail becomes exorbitant. Therefore, many organizations forgo this auditing and have mainly relied on other database auditing tools although they get an incomplete audit view, as data is usually presented in complex SQL statements and not as the user viewed the data on the screen. In addition, only data that was queried, inserted, updated and/or deleted will be recorded; if data was copies and pasted into a word processing program, for instance, there would be no record of the data manipulation since it did not occur in the database.

Auditing agent 140 may be configured to support various external auditing solutions including reporting tools, $3^{rd}$ party auditing software and other enterprise-wide auditing solutions to provide a raw data auditing data of user events of Oracle Forms systems. External auditing solutions may be located either locally or externally and reformat the output auditing data according to required specifications of external auditing solutions including: file, HTTP, DB, XML, Message Queue messages, JMS, and the like.

Therefore, auditing agent 140 may enable user event auditing using existing Oracle Forms, without modifying the Oracle Forms application code or functionality and without causing any overhead on the existing systems or network. Auditing agent 140 may be configured to support real-time and post-event auditing.

Figure 6:
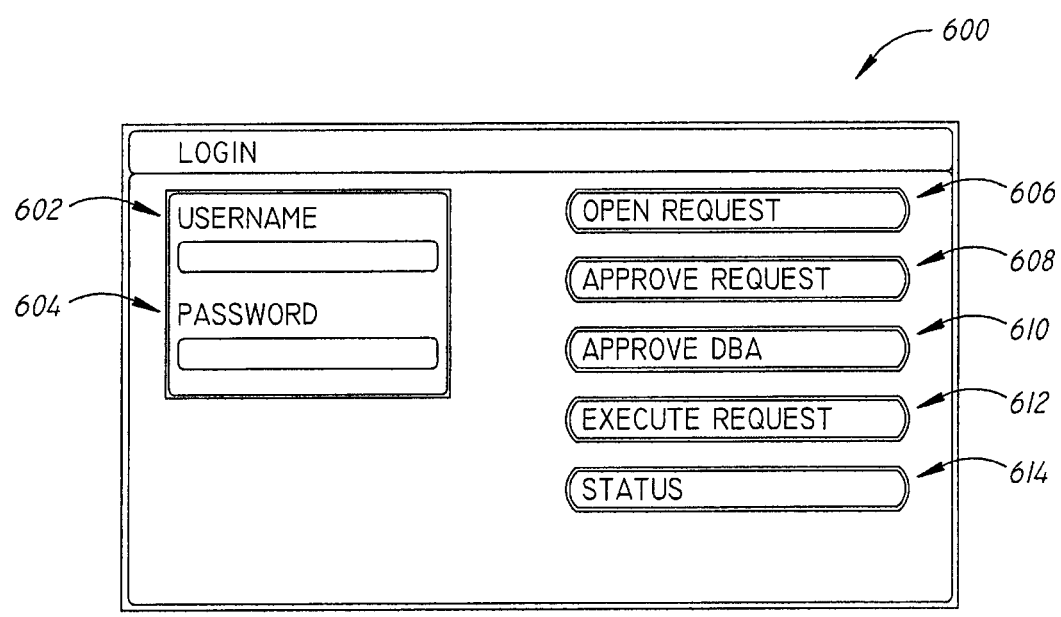
FIG. 6 shows a semi-pictorial view of an exemplary login window.

Reference is now made to FIG. 6, which shows an exemplary login window 600 of a Forms application. A username field 602 may be configured for input of a username. A password field 604 may be configured for input of a password. An open request button 606 may be configured to allow the user to open a request. An approve request button 608 may be configured to allow the user to approve a request. An approve DBA button 610 may be configured to allow the user to approve a DBA. An execute request button 612 may be configured to allow the user to execute a request. A status button 614 may be configured to allow the user to get a status.

The auditing process performed over login window 600 may output, as an example, an XML code such as the following one:

```
<MAIN>
    <Action   type="WindowActivated"   window="MAIN"   time="11:01:46
02/12/2010"   clientIP="192.168.1.102"   clientHostName="yossi"   name="MAIN"
label="WindowActivated" />
    <Form windowName="MAIN" time="11:01:46 02/12/2010">
        <Text label="username" value="" />
```

```
    <Text label="password" value="" />
    <Button label="connect" />
    <Button label="open request" />
    <Button label="approve request" />
    <Button label="approve DBA" />
    <Button label="execute request" />
    <Button label="status" />
    </Form>
    <Action type="Focus" window="MAIN" time="11:01:49 02/12/2010"
clientIP="192.168.1.102" clientHostName="yossi" name="MAIN_USERNAME_0"
label=" username " />
    <Action type="SetValue" window="MAIN" time="11:01:53 02/12/2010"
clientIP="192.168.1.102" clientHostName="yossi" name="MAIN_USERNAME_0"
label=" username " value="MIA" />
    <Action type="KeyPressed" window="MAIN" time="11:01:53 02/12/2010"
clientIP="192.168.1.102" clientHostName="yossi" name="MAIN_USERNAME_0"
label="KeyPressed" value="Tab" />
    <Form windowName="MAIN" time="11:01:53 02/12/2010">
    <Text label=" username " value="MIA" />
    <Text label="password" value="" />
    <Button label="connect" />
    <Button label="open request" />
    <Button label="approve request" />
    <Button label="approve DBA" />
    <Button label="execute request" />
    <Button label="status" />
    </Form>
    <Action type="SetValue" window="MAIN" time="11:01:57 02/12/2010"
clientIP="192.168.1.102" clientHostName="yossi" name="MAIN_PASSWORD_0"
label="password" value="ORACLE" />
    <Action type="Focus" window="MAIN" time="11:01:57 02/12/2010"
clientIP="192.168.1.102" clientHostName="yossi" name="MAIN_LOGIN_0"
label="connect" />
    <Form windowName="MAIN" time="11:01:57 02/12/2010">
    <Text label=" username " value " value="MIA" />
    <Text label="password" value="ORACLE" />
    <Button label="connect" />
    <Button label="open request" />
    <Button label="approve request" />
    <Button label="approve DBA" />
    <Button label="execute request" />
    <Button label="status" />
    </Form>
    <Action type="ButtonPressed" window="MAIN" time="11:01:57 02/12/2010"
clientIP="192.168.1.102" clientHostName="yossi" name="MAIN_LOGIN_0"
label="connect" value="connect" />
    <Form windowName="MAIN" time="11:01:57 02/12/2010">
    <Text label=" username "value " value="MIA" />
    <Text label="password" value="ORACLE" />
    <Button label="connect" />
    <Button label="open request" />
    <Button label="approve request" />
    <Button label="approve DBA" />
    <Button label="execute request" />
    <Button label="status" />
    </Form>
</MAIN>
```

Figure 8:
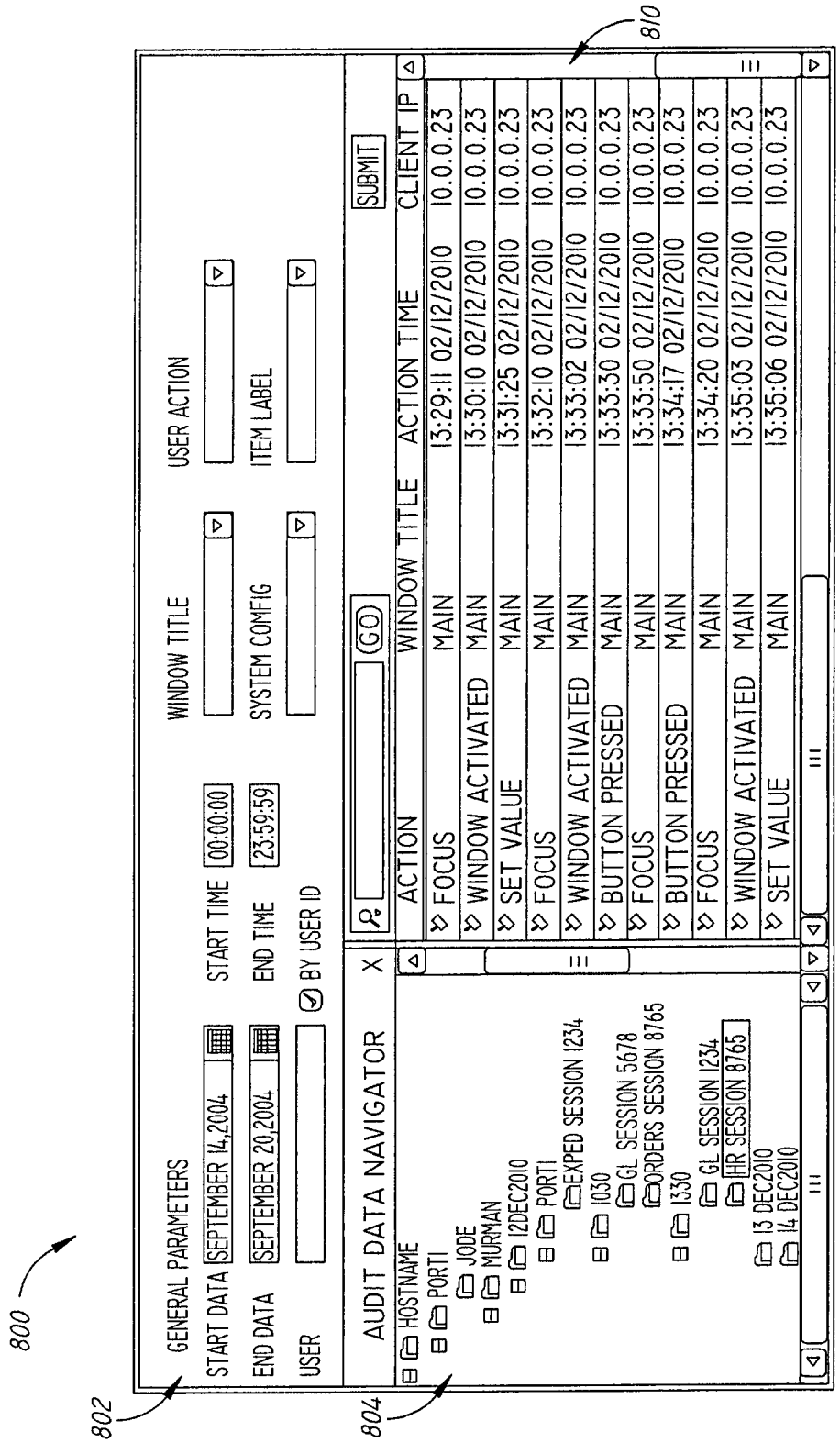
FIG. 8 shows a semi-pictorial view of an exemplary auditing console.

Reference is now made to FIG. 8, which shows an exemplary auditing console 800. Auditing console 800 may be configured to allow a system administrator to review auditing data and produce auditing reports. The auditing process performed over login window 600 (FIG. 6) may be reviewed in auditing console 800. A general parameters pane 802 may be configured to allow the system administrator to select the desired parameters to filter the auditing data. A navigation pane 804 may be configured to allow the system administrator to select the desired level of audit data. An output pane 810 may be configured to allow the system administrator to review the audit data output.

Figure 4:
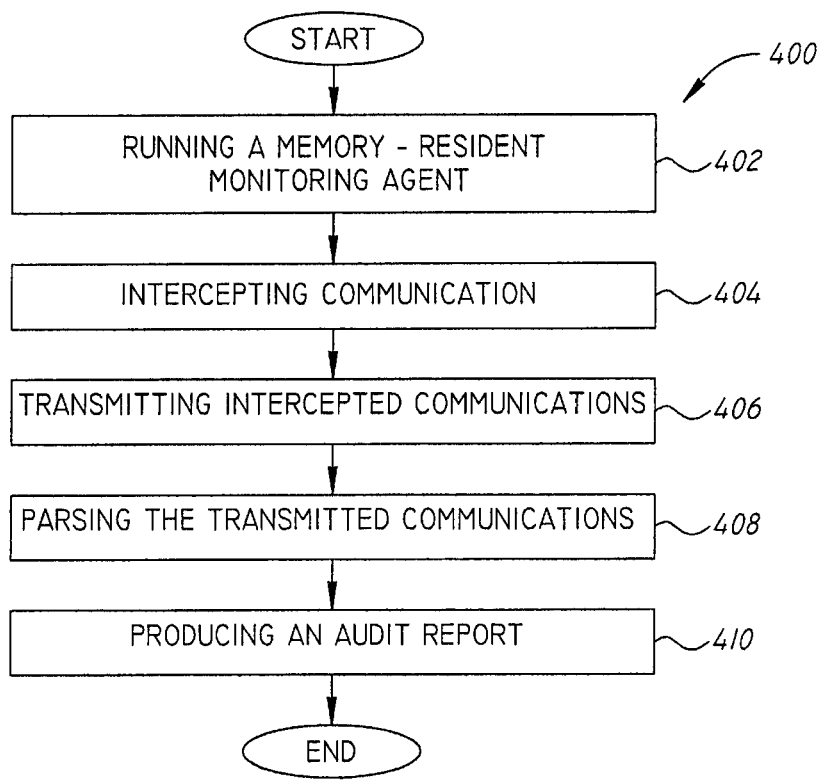
FIG. 4 shows a flow chart of a method for auditing communications between a client running an Oracle Forms application and an Oracle Forms server.

Reference is now made to FIG. 4, which shows a flow chart of a method 400 for auditing communications between a client running an Oracle Forms application and an Oracle Forms server. In a block 402, Forms client runs a memory-resident auditing agent.

In a block 404 the auditing agent automatically interfaces with a Forms Listener of the Oracle Forms application, to intercept communications between the Oracle Forms application and an Oracle Forms server.

In a block 404, the auditing agent transmits at least a portion of the intercepted communications to an auditing server. Optionally, the intercepted communications are stored in the auditing server and/or in a different database, file and/or the like.

In a block 408, the auditing server parses the transmitted communications.

In a block 410, the auditing server produces an audit report which lists a set of actions performed by the client, along with a corresponding textual description of at least a portion of the Oracle Forms application.

Reference is now made back to FIG. 1. In an embodiment, advantageously, Oracle Web Forms toolset 100 may include a guarding agent 160 configured to provide a real time data protection. Managing Operational risk is becoming an important aspect of risk management practice worldwide, including the financial sector. Operational risk is defined by the Basel committee as "direct or indirect loss resulting from inadequate or failed internal processes, people and systems or from external events."

Protecting sensitive information from unauthorized manipulation and disclosure by its employees and management has become a major concern for large organizations worldwide. Adopting constant data protection and auditing as standard ongoing procedures in the organization may help large organizations to minimize the risk of data breach.

Oracle Web Forms toolset 100 may help organizations to inspect internal processes, including real-time activities of the users who perform these processes and the systems by which these processes are performed. The inspection may be carried by tracking end-user behavior patterns and triggering alerts on exceptions in real-time. According to an embodiment, oracle Web Forms toolset 100 may be used to inspect access to sensitive business data and identify internal fraud, data leakage and may block critical processes in real-time mitigating many operational risks.

Guarding agent 160A may offer a unique and innovative solution for mitigating this insider threat by continuously recording and analyzing all end-user activity across multiple applications and/or across multiple platforms in the enterprise Guarding agent 160A may be configured to receive user events intercepted by recording agent 130 and collect valuable forensic evidence. User events data may be recorded along with labels defined in the form itself. In case that the underlying database tables have additional fields they are of no concern to the viewer and may be omitted from our logging. Only data that has been viewed or manipulated by the end user is recorded so the audit data is as targeted as possible.

In addition, guarding agent 160A may be configured to inspect, in real time, received user event data including user interaction with Forms server 120 and provide tracking of end-user activity.

Guarding agent 160A may be configured to inspect user events according to configurable restriction rules, and respond in real-time to user events according to response rules, including, for example, locking the current form session to restrict the user's continued work.

Guarding rule storage 162 may be located locally or remotely and configured to store restriction rules defining which data fields are restricted and under what conditions, whether restriction rules block or allow user events and response rules defining what actions should be taken upon violation of certain restriction rules. Restriction rules may include user behavior patterns.

Guarding agent 160A may be configured to selectively limit user access to sensitive data at several levels. As the user interacts with Forms client 102, guarding agent 160A may be configured to checks that the action performed by the user conforms to restriction rules. If the restriction rules allow the action to be performed, guarding agent 160A allows the action to be sent to the Forms server 120. The action is recorded along with the data received from the server, providing a second snapshot of the user activity and the data presented to the user. This second snapshot may be sent to the auditing agent 140 which processes the data as part of the auditing process. This process of record, filter and store is repeated for every user action to provide a series of snapshots of user activity and data viewed forming a detailed user history. If restriction rules do not allow the action to be performed, guarding agent 160A may block the action from being sent to Forms server 120. The action is recorded providing a second snapshot of the user activity and data presented to the user. This second snapshot may be sent to the auditing agent 140 which process the data as part of the auditing process.

An example for guarding agent 160A operation may include the following scenario. A system administrator may define restriction rules and response rules to perform if certain restriction rules have been violated, including: notifying the user that access to selected field is restricted, sending an email to system administrator logging the user attempt to review or modify the content of the selected field, optionally including in the email all of the time/date/user information associated with the attempted action. Alternatively, response rules may include a set of actions that executes automatically when a user attempts to access a restricted field, including, optionally, to the lock the current user's Forms session. Furthermore, guarding agent 160A may control the access to sensitive data by prompting a user to enter a password before either viewing or modifying the sensitive data. Guarding agent 160A operation works seamlessly in conjunction with existing Forms clients 102, without the need to reprogram or edit the Forms clients 102 themselves.

Optionally, the system administrator may include a response rule that blocks user attempts to access privileged data during specific hours or block user attempts to perform unauthorized actions on specific fields or with specific values. For example, an alert will popup and block user activity if a bank teller tries to access the bank president's bank records. In such a case, the alert triggers automatic suspension of the suspicious user in real-time.

In addition, response rules may include several ways to respond to violation of restriction rules including: sending email to system administrator, open a different form, stopping current session and displaying message box to the user, blocking the user in real time on the client side before the data or action reach Forms server 120, prompting the user to press a button or lock the Form, checking whether the current user has permission to access the requested records, preventing user interface 104 from displaying specific data, generating alerts on exceptions in real-time.

Oracle Web Forms toolset 100 may include a player agent 160B, which may be configured to process a scenario file, and orderly replay scenario commands stored therein. Scenario commands may be created by a recording process done by recording agent 130 or may be created or modified by the system administrator. Scenario commands may be stored in a scenario file.

In addition, player agent 160B may be configured to allow visual replay of user screens and keystrokes in any application, as if looking over a user's shoulder.

Once a scenario file has been created by recording agent 130 or by other tools, it may be replayed automatically with or without user interaction using either the same static data entered during the session recording process or as parameters by sending new data values dynamically. In addition, a scenario file may also be played back either silently, or visually, as part of an Oracle Form automation process.

A scenario file playback may be initiated by a monitoring robot 158, SOA server 120, interconnection agent 170 connected to one or more external modules, such as unified desktop connector 172, CTI connector 174, or the like.

Alternatively, playing the scenario can be done per user or external system request by running it via API (Application Program Interface) or command line/Java/Web service/JMS.

A scenario file replay may be used to facilitate a web service, a Java client or by a command line command, using either the recorded parameter data or different parameters. The recording and playback of all scenarios requires no intervention by a Forms developer and no knowledge of Forms or coding.

SOA server 120 may be configured to support running playback of scenario files in a silent mode. When running playback in silent mode, the scenario can be run without the browser and GUI of the form. Running playback without the browser open may be useful when the user wants to receive the OUT parameter values without running the forms session. Silent mode playback may be also used to integrate external application triggers, in batch mode without a client interface or in visual GUI mode.

Oracle Web Forms toolset 100 may include a service-oriented architecture (SOA) server 120 configured to provide SOA and web services capabilities to Oracle Web Forms toolset 100.

SOA server 120 may be configured to enable administrators to create a web service that runs an Oracle Forms business scenario and returns output parameters. A "business scenario" may be any series of Oracle Forms actions. This feature is useful for several use cases. For example, a company uses different applications developed in different technologies and wishes to transfer parameters or other data between Oracle Forms and other applications. In this case, a system administrator may create a web service that runs an Oracle Forms business scenario that performs a query and outputs return values in a format appropriate for the external application. Storage module 132 may be configured to store scenario files, which may be executed as web services by SOA server 120.

A web service may take values from certain fields on the form and returns them to the calling function. Similarly, data obtained from an external application can be modified to conform to an Oracle Forms field and entered into a Form automatically by recording the data entry steps as a service. There are scripting languages or 'integration' platforms (such as BPEL or Oracle Service Bus), that call different systems from the same script. Those scripts perform some actions on other components, run the web service application with dynamic parameters generated from previous actions, receive responses from the web service application, and use the web service application output for the next steps in the script.

SOA server 120 may be configured to allow external application to access and execute web services stored in Storage module 132. In addition, according to some embodiments, performing operations (e.g., queries, data entry) on Oracle Forms from outside an Oracle application, such as by button presses, are enabled. In this case a button press is programmed to execute a recorded service.

The web service or external application need to operate the service to get the technical functionality locked in the Oracle Forms screen as an external function. Moreover, all of the aforementioned features are GUI-independent, as they are not dependent on a specific browser, applet or external tool in order to execute.

SOA server 120 may enable legacy technology to be part of an Enterprise Application Integration (EAT) workflow process thereby opening Oracle Forms up to the world of XML, BPEL and Java.

In another use case, a company stores much detailed information in an Oracle database, yet the company would like to expose only select fields in the Form to public users. For example, on a customer service website the customer enters a personal ID no. and the website returns an associated name (e.g., John Smith) without any additional details. The Company may store customer ID, customer names and additional customer information in an Oracle Forms system. The system administrator may record a script that takes a personal ID no. as a dynamic IN parameter and returns an associated name as an OUT parameter. The web service then takes this OUT parameter and displays it to the customer, inter alia, in a web browser application not using Oracle Forms. When a user runs this application, he enters an ID no., and receives his name without being exposed to all of the data in the Oracle Form.

Web services may provide functional building-blocks of code accessible over standard Internet protocols independent of platforms and programming languages, and can therefore be used to implement a software-as-a-service (SAAS) architecture. SOA may include several features including: reuse, granularity, modularity, composability, componentization and interoperability, standards-compliance (both common and industry-specific), services identification and categorization, provisioning and delivery, monitoring and tracking.

Web services may represent either new applications or just wrappers around existing legacy systems to make them network-enabled. According to present embodiments, a user may write a script in any programming language that can then run specific encapsulated Oracle Forms business logic in scenario based macros that were pre-recorded by the system administrator.

In order to create an SOA service, the system administrator may take the following steps: record a scenario that performs actions on Oracle Forms—a business scenario; define input and output parameters; save the service as a scenario file. Recording toolbar 280 may be configured to allow the system administrator to record a scenario file by checking a "Record as a web service" 298 checkbox.

In addition, the system administrator may decide to capture output parameters to later enable sending the captured field as output data to the calling application. For example, if the form input is a user name and the output captured is a corresponding user ID number. In this example, the user records a scenario of entering a user name into an Oracle Form and then capturing the user ID number from the Oracle Form to later be transferred to the calling application. Using any script or programming language, the user can then call this SOA service by executing a required web service which may be stored in storage module 132. In addition, a web service may be executed through a web service, java program or command line, with the required input parameters (in the example case, user name), and can use the output parameter (in the example case, user ID number). The output parameter can be used by the Web service to perform other actions.

Oracle Web Forms toolset 100 may include an interconnect agent 170 configured to provide an interface between player agent 160B, VTI Forms Listener 112 and external modules of Web Forms toolset 100 that may exist external to the Forms client 102.

Interconnect agent 170 may be configured to allow transfer of data and business context between various business systems and player agent 160B, as well as to trigger form functions based on functions performed in external applications. Interconnect agent 170 may be configured to receive input data from an external module, reformat the input data according to the external module type and transmit the input data to player agent 160B. In addition, interconnect agent 170 may be configured to receive output data from VTI Forms listener 112, reformat the output data according to the appropriate external module type and transmit the output data to the appropriate external module.

Interconnect agent 170 may be configured to allow the external module to interact with player agent 16013 and VTI Forms listener 112 by running a scenario file and thereby establish a visually integrated indirect interface with Forms server 120, which is similar to the interface between Forms client 102 and Forms server 120. In addition to handling the business integration, interconnect agent 170 may also receive session data about the health of the Oracle Form client, received from the Forms server via the VTI Forms listener. Such data may include "keep-alive" status, messages, alerts, and error messages which may sometimes not even be shown to the user.

Figure 3:
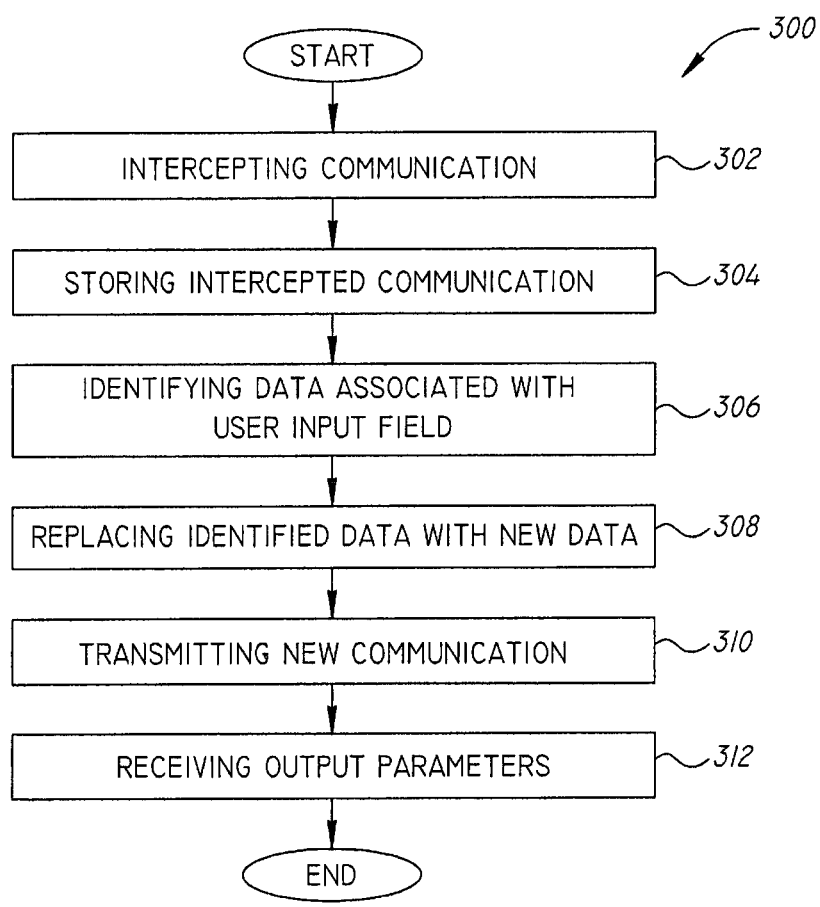
FIG. 3 shows a flow chart of a method for automatically operating an Oracle Forms application.

Reference is now made to FIG. 3, which shows a flow chart of a method 300 for automatically operating an Oracle Forms application.

In a block 302, a recording agent uses a VTI Forms listener to intercept communications between the Oracle Forms application and an Oracle Forms server.

In a block 304, the recording agent stores the intercepted communication into storage module.

In a block 306, the recording agent identifies, in the intercepted communication, data associated with at least one user input field and may optionally set fields to be captured as output parameters of the Oracle Forms application.

In a block 308, the recording agent replaces, in the intercepted communication, the identified data with new data corresponding to the user input field of the Oracle Forms application. One or more of the following modules: monitoring robot, SOA server, unified desktop connector, CTI connector, toolset API produces a new communication.

In a block 310, a player agent receives the new communication from an external module and transmits the new communication to the Oracle Forms server, using a Dispatcher component of the Oracle Forms application, thereby causing the Oracle Forms application to operate automatically, either silently or visually with the interconnect agent.

In a block 312, the external application or one or more of the following modules: monitoring robot, SOA server, unified desktop connector, CTI connector, toolset API may receive the output parameter values as defined in the scenario file.

Reference is now made back to FIG. 1. CTI (Computer Telephony Integration) is widely used by organizations that provide telephony services or customer service interaction via telephone. Typically, when a customer calls a telephony service the customer is prompted to enter his details. The customer is subsequently redirected to a customer service representative for support. In a best-case scenario, when the customer is redirected to a customer service representative the customer details automatically pop-up on the support application screen.

Oracle Web Forms toolset 100 may include a CTI connector 174 configured to provide a framework for integration of Oracle forms with CTI systems.

The system administrator can record a typical scenario performed in a call center, for example, a customer service agent taking a service call. Here, in real-time, the agent performs a series of operations including: receiving customer details as input; and querying the database for the customer's history and other relevant information. The system administrator may define the customer details as dynamic IN parameters. After the initial recording, the scenario is saved to a file. The scenario is set to run automatically when a call is received. When a call is received, it is answered by an automated phone operator that prompts the user to enter his information, inter alia, by speaking the information into the phone or punching in numbers on the user's telephone handset. The customer details entered by the customer are the dynamic IN parameters used by the scenario. When the call is transferred to a customer service representative, player agent 160B may be configured to run a scenario file and send the query output to the customer service representative through user interface 104. This feature improves the service and the response time as the customer service representative does not need to perform any operations in order to retrieve relevant customer data.

CTI connector 174 may be configured to interact with the interconnection agent 170 and run the scenario file by sending CTI data to interconnection agent 170 after receiving the input parameters entered into the CTI connector 174.

The provided framework for integration of Oracle forms with CTI may save valuable time and resources. When the call is transferred to a customer service representative the query output form generated by the scenario is already displayed to the customer service representative, which can immediately attend to the customer's needs.

Access to timely and accurate information may be crucial to corporate survival. Sometimes it is not enough to integrate databases; it is highly advantageous to provide managers with a management dashboard or unified desktop as a holistic view of all aspects of the business from various systems at a single glance. A unified view of multiple business processes allows decision makers to make accurate decisions quickly.

Oracle Web Forms toolset 100 may include a unified desktop connector 172 which may be configured to allow sharing of business information across external applications which may be visually integrated in a common desktop or dashboard architecture. Unified desktop connector 172 may be configured to visually integrate multiple systems and provide a single point of contact for all systems to be integrated on the front end. Values are entered into Oracle Forms fields automatically, through a unified desktop interface, and Oracle Forms business logic runs automatically by running the business scenario from one or more external modules. Furthermore, unified desktop connector 172 may enable extracting values from Oracle Form fields for integration with outside systems. In addition, unified desktop connector 172 may be configured to provide visual client side integration of multiple, independent, business-related systems.

Each of the systems being integrated into the unified desktop may be developed using a different technology. In order to visually integrate multiple systems in a single user interface there is a need to support the passing of parameters in a two-way client side integration with Oracle Forms. Unified desktop connector 172 may be configured to use two-way client side integration with Oracle Forms which allows the unified desktop connector 172 to run Oracle Forms business processes and extract out parameters from Oracle Forms systems for the use of other systems contained in the unified desktop.

According to an embodiment, Oracle Web Forms toolset 100 may include a monitoring agent 150 configured to run within Forms client 102 and receive intercepted session data transmitted from VTI Forms Listener 112 including user session events as they are transmitted from Forms Dispatcher 106 to Forms server 120. Monitoring agent 150 may be configured to calculate and track the performance and network statistics of each individual client-side operation performed by each user. In addition, the intercepted data may be recorded, so that it is later possible to analyze the performance of specific user events of interest.

Monitoring system performances over a large scale computing enterprise systems is becoming an important and complex task. System downtime and outages cost companies millions each year and identifying system weaknesses and performance bottlenecks in advance can save companies much headache and valuable resources. An increasing number of corporations consider high utilization of computational resources as a major goal in their business model. The ability to monitor system performances in real time is an important tool for achieving high utilization of computational resources, identifying problem areas and system bottlenecks and receiving quick response alerts and real-time notification on system performance irregularities when necessary.

Monitoring agent 150 may be configured to track time span, server response time and network throughput for each action. Monitoring agent 150 may be configured to collect the data from all the Oracle Forms' users on the client side, process the collected data, and send it to the a monitoring server 152 which may be configured to perform further data processing over the collected monitoring data and store it in a monitoring DB 154 which may be used to store monitoring data.

A monitoring robot 158 may be configured to run a silent playback of scenario files according to a pre-determined monitoring schedule. System administrator may choose the monitoring schedule and the scenario files which will be used to monitor the system performance.

In addition monitoring robot 158 may be configured to produce monitoring data in a similar way to monitoring agent and send monitoring data to monitoring server 152 in a similar why to monitoring agent 150.

Figure 7:
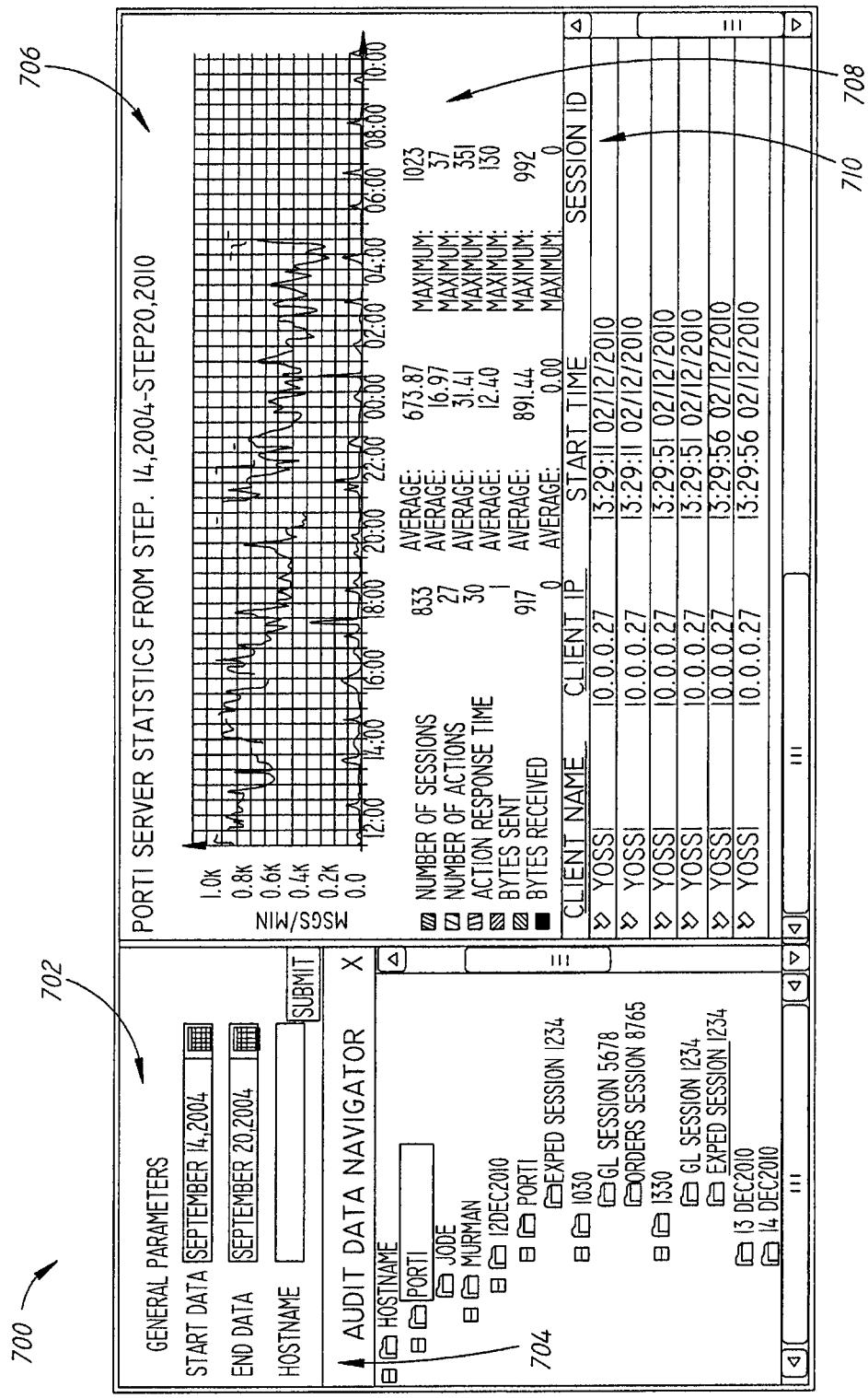
FIG. 7 shows a semi-pictorial view of an exemplary monitoring console.

Reference is now made to FIG. 7, which shows a semi-pictorial view of an exemplary monitoring console 700, which is similar to monitoring console 156 (FIG. 1), and is shown here in greater detail.

Monitoring console 700 may be configured to receive monitoring data from monitoring DB 154, and to further allow the system administrator to review system performance reports.

A general parameters pane 702 may be configured to allow the system administrator to select the desired parameters according to which the monitoring data is filtered, such as a data range, a host name and/or the like.

A navigation pane 704 may be configured to allow the system administrator to select the desired level of monitoring data.

A statistics graph 706 may show the monitoring data visually, over various selectable axes.

A summary pane 708 may be configured to allow the system administrator to review a summary or an entirety of the monitoring data. This summary optionally serves as the basis for statistics graph 706.

An output pane 710 may be configured to allow the system administrator to review the raw monitoring data output.

In addition, monitoring console 700 may be configured to produce an additional monitoring report including availability report, error report, usage report, system functionality report and/or the like.

Alternatively, monitoring DB 154 and/or monitoring server 152 (FIG. 1) may be configured to deliver monitoring data to external third-party software solution used for further processing and review of monitoring data.

Figure 5:
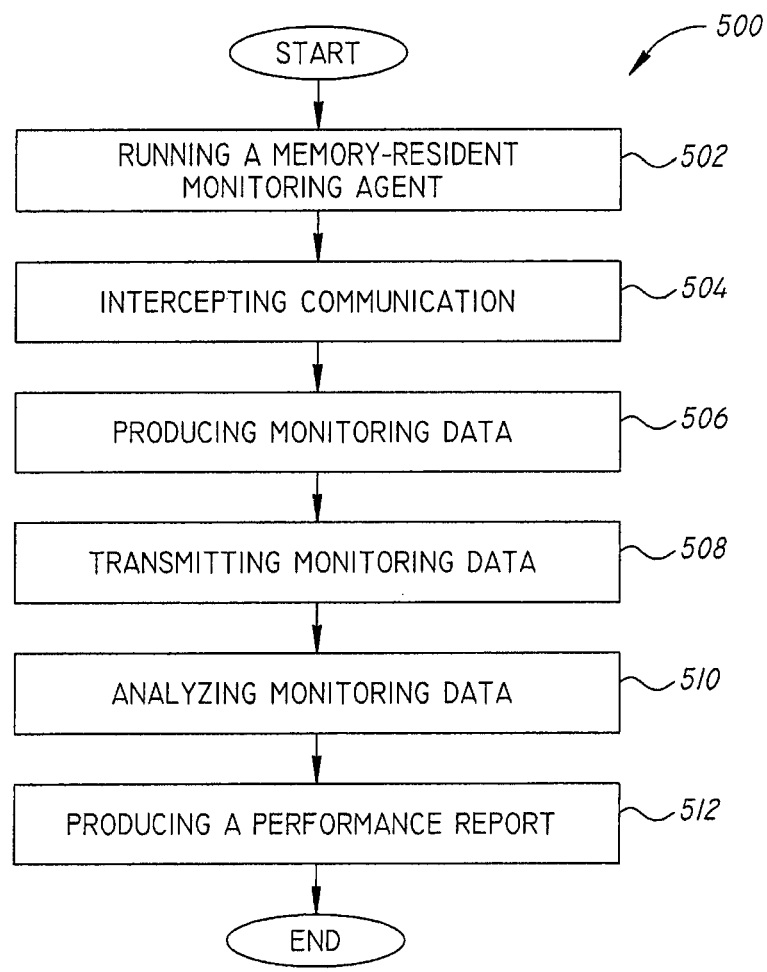
FIG. 5 shows a flow chart of a method for monitoring communications between a client running an Oracle Forms application and an Oracle Forms server.

Reference is now made to FIG. 5, which shows a flow chart of a method 500 for monitoring communications between a client running an Oracle Forms application and an Oracle Forms server.

In a block 502, a Forms client runs a memory-resident monitoring agent.

In a block 504, the monitoring agent automatically interface with a Forms Listener of the Oracle Forms application, to intercept communications between the Oracle Forms application and an Oracle Forms server.

In a block 506, the monitoring agent produces performance data.

In a block 508, the monitoring agent transmits the performance data to a monitoring server.

In a block 510, the monitoring server parses and statistically analyzes the performance data. Optionally, the performance data is stored in a non-volatile memory device, such as a database, a file and/or the like.

In a block 512, the monitoring console produces a performance report based on the monitoring data.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

In the description and claims of the application, each of the words "comprise" "include" and "have", and forms thereof, are not necessarily limited to members in a list with which the words may be associated.

What is claimed is:

1. A method comprising, in a computerized system that includes:
   (i) a client interacting with a user via a user interface, wherein the user interface includes fields for data entry,
   (ii) a recording toolbar,
   (iii) an application server that is a component of a middleware, the middleware is a software application that provides an interface between the client and the application server, the application server interacts with the client, and comprises (a) a runtime module running a software application that provides the user interface and (b) a listener component that intercepts communications between the client and the runtime module, and
   (iv) a database management system (DBMS) in communication with the application server:
   intercepting, using the listener component of the application server, a communication between the client and the application server;
   identifying, in the intercepted communication, data associated with a sequence of user events of the client, wherein each of the user events is selected from the group consisting of: (a) an interaction of the user with the user interface, and (b) a unique session identifier;
   operating the recording toolbar to record the data as a web service, and adding the recorded data to a scenario file, wherein the scenario file is a script that comprises commands for running the software application, and wherein the operating of the recording toolbar to record the data is performed: (a) whenever a specific URL (Uniform Resource Locator) of the software application is launched, or (b) responsive to the user clicking a record button in the recording toolbar;

providing a web-based user interface through the web service, and displaying the recorded data in a parameters window of the web-based user interface;

enabling the user to edit the scenario file by defining, in the parameters window, which fields of the recorded data are to be registered as input or output parameters;

executing the script by an external application, the external application is executed on a platform different from the software application, wherein the external application is a web service, to orderly transmit the commands in the scenario file from the external application to the application server, thereby:

(a) causing the runtime module to operate the software application automatically, wherein the operating comprises querying the DBMS, and (b) outputting return values from the querying in a format suitable for the external application;

receiving, by the external application, captured data;

using the entered data to execute the querying of the DBMS via the application server;

outputting return values from the querying for display; and operating an auditing agent application to produce a log of the user events based on the intercepted communication.

2. The method according to claim 1, further comprising:

interfacing with a computer-telephone integration (CTI) system for receiving a caller identifier; and utilizing the caller identifier as at least a part of the scenario file, such that the automatic operation of the software application comprises displaying, in the user interface, information associated with the caller.

* * * * *